April 7, 1936.  P. KOLLSMAN  2,036,581
LEVEL FLIGHT INDICATOR
Filed March 7, 1930  2 Sheets-Sheet 1

Paul Kollsman INVENTOR
BY Louis Shumacher ATTORNEY

April 7, 1936.                P. KOLLSMAN                2,036,581
                          LEVEL FLIGHT INDICATOR
                           Filed March 7, 1930           2 Sheets-Sheet 2
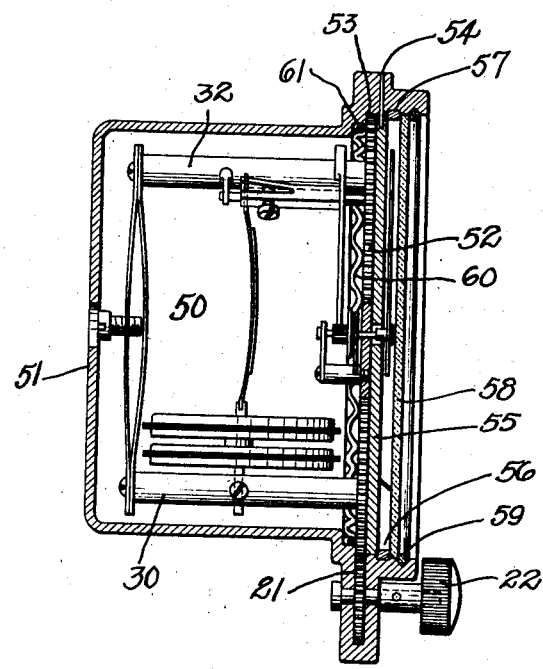
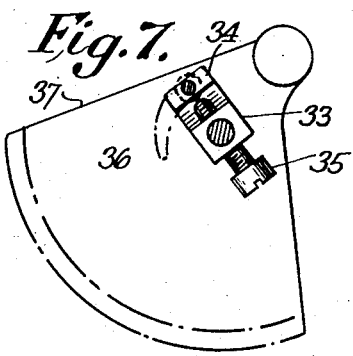
INVENTOR
Paul Kollsman
BY
Luis Chumacher
ATTORNEY Patented Apr. 7, 1936

2,036,581

UNITED STATES PATENT OFFICE 2,036,581

LEVEL FLIGHT INDICATOR

Paul Kollsman, Woodhaven, N. Y.

Application March 7, 1930, Serial No. 433,883

24 Claims. (Cl. 73—4)

This invention relates to level flight indicators.

One object of the invention is to provide a device of the character described including an indicator adapted to be set for any elevation of an aircraft, and improved means to indicate any deviation up or down from said elevation, in a manner that may be readily noted by the observer.

The device provided by this invention has a dial which is preferably free of all indicia except as may be necessary to show the position, plus or minus, of an aircraft with respect to the elevation which is to be maintained. For indicating the actual elevation, any ordinary altimeter may be used in the conventional manner, and may be mounted on the instrument board near the level flight indicator.

Another object of the invention, therefore, is the provision of a device of the nature set forth having means to indicate solely whether an aircraft is above or below the desired level.

Another object of the invention is to furnish an indicator of the type mentioned having indicating means or indicia which extend horizontally at the elevation to which the instrument has been set.

A further object of the invention is to construct a level flight indicator in which each rotation of the pointer signifies an even change in elevation, so that while an aircraft is in upward or downward flight, the pointer will come back to initial or zero position with every change in elevation of an even or predetermined extent.

Another object of the invention is to provide a device of the class alluded to having improved means for rotatably mounting the aneroid mechanism in a simple and inexpensive manner.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Fig. 6 is a view in vertical section of an instrument showing a modified mounting of the aneroid mechanism for rotation thereof.

Fig. 7 is a plan view of the operating mechanism of Fig. 4, with certain parts removed.

Figure 1:
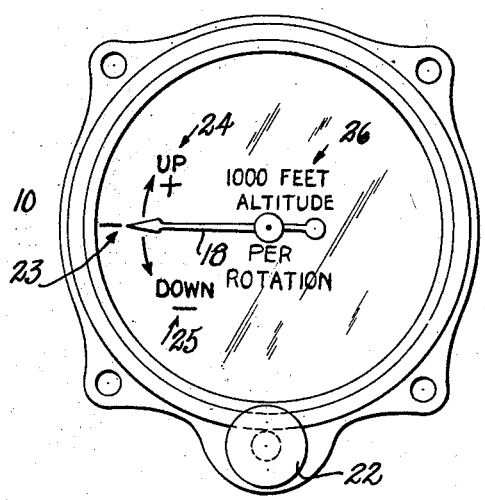
Figure 1 is a front view of a device embodying the invention.
Figure 2:
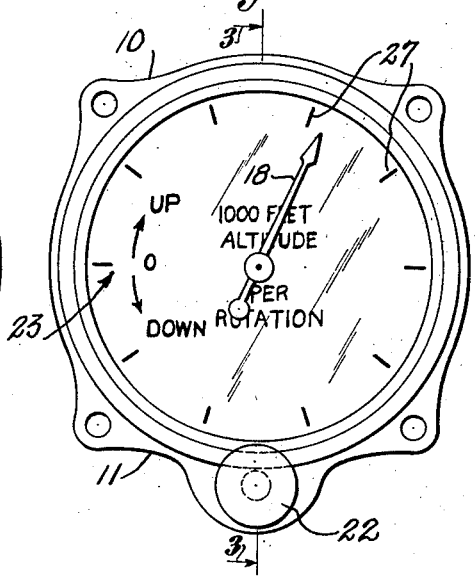
Fig. 2 is a similar view with the pointer moved by the instrument from the set or initial position, and the dial slightly modified.
Figure 4:
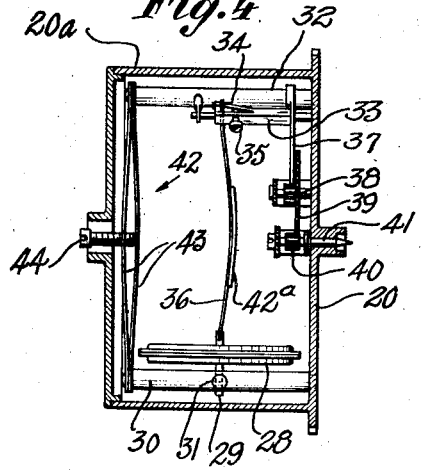
Fig. 4 is a vertical sectional view showing the internal construction of the indicator.
Figure 3:
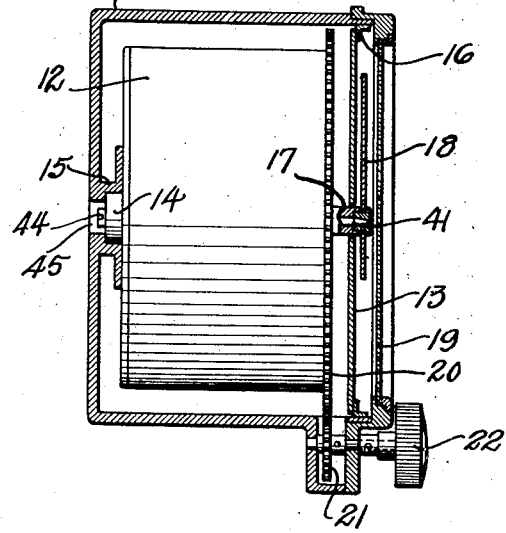
Fig. 3 is a view in vertical section taken on line 3—3 of Fig. 2.
Figure 5:
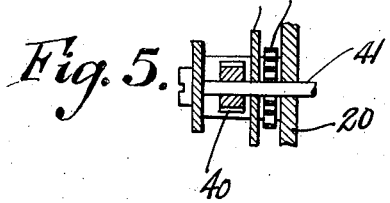
Fig. 5 is an enlarged vertical sectional view showing details of invention.

This invention may be constructed according to my invention indicated in my copending application on Aneroid and operating means therefor, Serial No. 433,882, filed March 7th, 1930, and issued on October 17th, 1933, under Patent No. 1,930,899, including particularly the self-sustaining aneroid, the temperature compensating means, the outside adjustment, and the rotary adjusting and setting means.

Generally described, the invention provides a level flight indicator having any suitable operating means which may include an aneroid. An indicating means actuated by the aneroid is shown herein to illustrate the invention, but the same may be embodied in different forms within the principle of the invention. The instrument is set for any required elevation, and the indicating means will show solely a change, up or down, from said elevation, without indicating the degree of change. Where a dial is used, the same will therefore be free of the fine graduations which occur on an altimeter and necessitate the careful reading thereof. The maintenance of a given elevation is important in photographic map work from aircraft, and in other cases. By means of the level flight indicator, the operator can tell at a glance whether he is maintaining his elevation. The indicating means, or pointer, if the latter be used, is rotatable with the aneroid in setting the instrument, while the dial may be relatively stationary. This arrangement has an advantage in that the indicating means may be set to extend in a horizontal direction, to facilitate observation of the instrument. By so calibrating the instrument that each rotation of the pointer indicates a change in flight in an even number of feet, the pointer will always come back to horizontal, or initial position, as the aircraft passes through each such vertical unit of elevation. This facilitates the adjustment and observation of the device and provides an additional elevation guide which is easily noted.

The instrument, in this case the aneroid and indicating mechanism may be mounted by a plate or disk which can be of large size and engages the side walls of the instrument casing. The said plate may be disposed in a plane at right angles to the axis of the operating mechanism, and may constitute the sole support for the aneroid and indicating mechanism. It may also reinforce the casing. By making the plate in the form of a disc or ring, the aneroid and indicating mechanism may be rotated relative to the casing for adjusting, setting, or otherwise rotating the same. Coacting with such ring or disc may be a means for rotating the aneroid and indicating mechanism. By making the ring or disc in the form of a gear or other power element, and engaging the same in relatively stationary relation to the casing, the same may be rotated to rotate the aneorid and indicating mechanism. The casing can have any suitable bearing portion for the ring or disc. While the latter may be variously positioned, it is preferably located between the operating mechanism and the dial of the instrument.

In a level flight indicator sensitivity of the instrument is of the essence, although accuracy of altitude indication is less important. The pointer provided by this invention will make many more revolutions for a given altitude than an altimeter.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, is submitted merely as showing the preferred exemplification of the invention.

Referring in detail to the drawings, 10 denotes a device embodying the invention. The device includes a casing 11 having therein a schematically shown support or housing 12 for an aneroid and the mechanism operated thereby. The latter is rotatably mounted in the casing, while the dial 13 coacting therewith is relatively stationary. The rotary mounting may include any suitable means such as a shaft 14 which is journaled in a bearing 15 of the casing. The dial 13 is secured in place, in any desired manner, as, for instance, by the members 16. Extending through the dial is a hub 17 for a spindle 41 carrying a pointer 18. A glass 19 surmounts the pointer and dial.

Rotation of the housing 12 and the pointer 18 as a unit in setting the device is accomplished in any suitable manner. For instance, the said housing may have an aligned gear 20, the teeth of which mesh with those of a pinion 21 that is turned by a knob 22.

The relatively stationary dial 13 has a zero or other reference mark 23 to indicate level flight while the pointer 18 registers therewith. The reference mark may be variously related to the pointer, but preferably the pointer is in horizontal position when in registry therewith. Associated with the reference mark are indicia 24, 25, the former an upward pointing arrow with the word "UP" and a plus sign, and the latter including a downward extending arrow, the word "DOWN" and a minus sign. Any other markings indicating that the aircraft is flying above or below the desired elevation may be employed.

The instrument is so calibrated that each complete revolution of the pointer 18 represents an elevational flight of 1000 feet, or other even numercial factor, as shown by the indicia 26. The instrument thus constitutes a general reference means for large changes in elevation.

The auxiliary markings 27 on the dial may be placed thereon for convenience, or may be omitted.

The housing 12 may contain therein any suitable pressure sensitive device, and may include an aneroid 28. The latter has a member 29 extending through an opening in a standard 30 in which it is adjustably secured by a screw 31. The said standard may be mounted on the gear plate 20 having secured thereon a casing 20a, and on which gear plate is also positioned another standard 32. Mounted on the latter standard and on plate 20 is a shaft 33 having an integral spring arm 34 adjustable by a set screw 35. Connecting the said arm with the aneroid 28 is a link 36, whereby the aneroid causes rotation of the shaft. Secured to said shaft is a gear segment 37 which turns a pinion 38 and its coaxial gear 39, and the latter a pinion 40 for rotating the spindle 41 and hence the pointer 18.

To provide temperature compensation for the aneroid, the link 36, or other part of the operating mechanism, has a dissimilar strip of metal 42a secured thereto constituting the link a thermostat which deflects and changes in length to change the setting of the mechanism by varying the angle of the arm 34, which extends at an acute angle to the direction of link 36, so that the moment thereof is changed. For a particular initial acute angle position of the arm 34, the instrument readings follow a definite curve. If said initial acute angle is changed by bending the thermostat or by changing the aneroid setting at 29, or both, the readings are greater or less, as the case may be, throughout the curve. The same thing happens if, due to a temperature change, the bowed shape of the thermostat changes. In any case, the adjustment of the parts is such that the arm 34 in course of its operating movement always extends in the same general direction relative to the thermostat 36; in other words, while the aneroid is expanding, the moment of the arm 34 is decreasing, and while the aneroid is contracting, the moment of the arm 34 is always increasing. This is sufficient to conform the mechanism to the characteristics of any standard aneroid, exclusive of ordinary adjustment and calibration of the instrument as a whole.

To permit adjustment of the instrument from the outside thereof, the standards 30, 32 are interconnected by a movable means 42 remote from the gear plate 20, whereby, on springing the standards toward each other, the relation of the link 36 and arm 34 may be varied and the setting of the entire mechanism adjusted. The means 42 may include a plurality of leaf springs 43, through one of which is threaded a screw 44 that bears on the other spring. By moving the springs apart, the standards are deflected toward each other. As the standards themselves constitute relaively long arms, a highly sensitive adjustment may be obtained. The adjusting screw 44 is accessible through the hollow shaft 14 and the opening 45 in the casing 11. The leaf springs 43 bracingly interconnect the standards.

The thermostat 42 and the adjusting means may be used in other types of level indicators or altimeters.

In a level flight indicator sensitivity is more important than accuracy, although both are desirable, particularly if the pointer is intended to return to zero for each 1000 feet difference in elevation. In an altimeter, range is the important feature, and the pointer can make only one revolution for its maximum range, since the pointer must afford continuous and direct reading on the scale.

The sensitivity of the device is rendered high by the employment of the gears 37 to 40 having a sufficiently high gear ratio and gear 37 having a sufficiently high radius to cause the pointer to make many more revolutions than an altimeter. A hair spring 46 coacts with the pointer spindle 41, and to guide the hair spring a disc 47 is mounted on the spindle adjacent to the hair spring. The hair spring may thus act with the spindle and excessive side deflection of the spring avoided. Any type of hair spring may be used, without the careful selection heretofore required. As shown in the drawings, the width of the spring is substantially greater than the clearance between the spring and either of the members 20 and 47, and is desirably greater than the sum of such clearance dimensions. Hence the spring, when under tension, contacts one of the members, or different turns of the spring contact the different members, whereby the spring is adequately supported in the event that the pointer makes several revolutions. I have observed that with such small clearances, the center coil of the hair spring is usually in constant contact with one of said members, preferably the disc 47 when the hair spring is tensioned. Since the clearance is in any case less than the width of the spring, different turns of this delicate spring cannot be sprung laterally and radially past each other, when the spring is under considerable tension.

Various changes may be made in the device herein disclosed, the embodiment thereof being illustrative merely, and the indicator may be constructed with different kinds of aneroids, mechanisms, and adjusting means.

In Fig. 6 is shown a modified mounting, which may be rotatable, for an instrument, as for example, an aneroid and indicating mechanism denoted as a unit by numeral 50, and housed in any casing 51. The aneroid mechanism may be of any desired type, or can be constructed according to the principles hereinbefore stated and described. The mounting is different, and may include a rotary element or gear 52 of large diameter that may coact with or take the place of the base plate 20 previously mentioned. In that case, the posts such as 30, 32 may be connected directly to the disc or gear 52. The latter is coaxial with the pointer spindle, and has suitable bearing relation with the casing or any portion related thereto. One simplified embodiment of the invention includes an annular grooved bearing 53, receiving a circular peripheral or edge portion of the gear, which may be the toothed part thereof. The said gear may have the teeth thereof in mesh with those of the pinion 21, whereby, on turning the knob 22, the gear 52 is rotated, and hence the aneroid mechanism.

The bearing 53 may be of any suitable diameter, or comparatively large as shown, thereby affording a reliable bearing for the rotation of the aneroid mechanism. As the gear 52 may be made comparatively strong, an affective combined support and gear is provided, with which the bearing 53 may have a unitary relation. By this invention, the aneroid mechanism may be supported at only one portion thereof, and the remainder of the mechanism or mounting can be free of the casing. This makes for a simplified and inexpensive mounting. The gear 52 may also re-enforce the casing by coaction with the bearing thereof.

The bearing 53 may be closed in any suitable manner, as, for example, by disposing the dial plate 55 alongside the gear to form a part of the bearing thereof. The dial plate may be held in position by a resilient split ring 56 setting into a groove 57. A pin 54 may hold the dial plate against rotation. Overlying the ring 56 is a glass 58 retained by a second ring 59.

To assure an easy rotation of the gear 52, a resilient or anti-friction means, as, for instance, a sinuous spring 60 may be mounted to act upon the gear, as by being disposed in groove 61 adjacent to the bearing 53.

A typical use of the invention is as follows: Assume that the aviator desires to maintain a particular flight elevation. He observes his altimeter and when the desired elevation is attained, he sets the level flight indicator by turning knob 22 until the pointer 18 is horizontal and in registry with reference mark 23. Thereafter the aviator need not observe the altimeter, but will easily note on the level flight indicator any change in altitude, either up or down, by the deviation of the pointer from the reference mark. Since the dial of the level flight indicator is free of scale markings, these observations may be readily made without fatigue. The level flight indicator can be reset at any time as desired. If another elevation is to be maintained, as by reason of a change in conditions during flight, it will in a great many instances be satisfactory to change the elevation by an even 1000 feet, in which case the pointer is again at its reference mark, without requiring that the device be reset. The new elevation can of course be observed on the altimeter, although the single revolution of the pointer of the level flight indicator will denote the change in altitude. Thereafter the required elevation can again be readily maintained with the aid of the level flight indicator.

I claim:

1. A device including an indicator, a casing therefor, a relatively stationary dial plate for the indicator, and means for rotatably mounting said indicator including a circular rotary member of large diameter, said dial plate being mounted alongside said rotary member, the casing having a bearing for the rotary member, said dial plate closing the bearing and slidingly contacting the rotary member.

2. A device including an aneroid, indicating mechanism actuated thereby, supporting means for the aneroid and mechanism including a plate, a plurality of spaced standards connected to the plate at an angle thereto, the aneroid being connected to one of said standards, means interconnecting the standards remotely from the plate, the interconnecting means being movable for causing an interrelative movement between the standards, a casing for the supporting means, aneroid and mechanism, and means accessible from the outside of the casing for moving the interconnecting means.

3. A device including an aneroid, indicating means actuated thereby, said indicating means including a rotary pointer operatively engaged with the aneroid, a circular scale concentric with the pointer, a frame including a plate, standards connected at one end to the plate, and means interconnecting the standards at points spaced from said plate to limit deflection of the standards, the indicating means being mounted on said frame, and the aneroid being mounted on one of said standards.

4. A device including an aneroid, and mechanism actuated thereby, said mechanism including a lever arm, and a thermostatic link pivotally interconnecting the lever arm with a central portion of the aneroid, said thermostatic link extending in the general direction of expansion of the aneroid, said thermostatic link being bowed along an arc of large radius for adjusting the effective length thereof.

5. A device including an aneroid, mechanism actuated thereby, said mechanism including a lever arm, a thermostatic link pivotally interconnecting an end of the lever arm with a central part of the aneroid, said link extending in the general direction of the aneroid axis and being adapted to be laterally bowed for adjusting the device, and means for adjustably mounting said aneroid for setting movement in the direction of said axis without affecting the tension on the aneroid.

6. An altimeter having an aneroid, a rotatable pointer, a scale therefor, mechanism operated by the aneroid for actuating the pointer, a casing for said aneroid and mechanism, said pointer and scale being at the front of the casing, said mechanism having elements including a link having one end thereof in free pivotal connection with the aneroid, said mechanism and aneroid being movable relatively to each other for setting, and means accessible from outside of the casing for adjusting the setting relation between the aneroid and mechanism, whereby the altimeter can be adjusted without affecting the tension of the aneroid.

7. A device including an aneroid, mechanism actuated thereby, supporting means for the aneroid and mechanism, said supporting means being yieldable for setting movement of the aneroid in the general direction of the aneroid's expansion, means for causing a yielding motion of the supporting means for producing the setting motion without affecting the tension on the aneroid, said mechanism including a link pivotally connected at one end to the aneroid, said link extending in the general direction of the axis of the aneroid, and said link being adapted to be laterally bent to vary the effective length thereof in the general direction of setting movement between the aneroid and mechanism.

8. A device including an operating instrumentality, mechanism actuated thereby, an indicator controlled by said mechanism, a support for the mechanism, said support including a projecting movable member to which the instrumentality is connected in such relation as to change the setting of the mechanism on movement of said member, a resilient element connecting the free end portion of said member with another part of the support, and means to deform said resilient element for causing a movement of said member.

9. A device including an operating instrumentality, mechanism actuated thereby, an indicator controlled by said mechanism, a support for the mechanism, said support including a projecting member capable of being sprung, to which the instrumentality is connected in such relation as to change the setting of the mechanism on movement of said member, a plurality of elements extending alongside each other and connecting the free end portion of said member with a part of the support remote from said member, one of said elements being resilient, and means acting between said elements to deflect the resilient element and cause the same to move said member.

10. A device including an aneroid, a pointer and actuating means operatively connecting the pointer with the aneroid, said actuating means including an elongated bimetallic thermostatic link connected at one end thereof to the aneroid in substantially central relation with the latter, the longitudinal axis of the link extending in the general direction of movement of the aneroid, and means including a lever arm pivotally connected to the other end of said link, whereby the link may be laterally bent into an arc of large radius intermediate of the ends thereof for obtaining a fine adjustment of the device.

11. A device including rotatable pointer means, a circular scale concentric therewith, an aneroid, mechanism operated by the aneroid for actuating the pointer, a casing, and a frame in the casing for mounting the aneroid and mechanism, said frame including a plate and a standard thereon, said standard being fixed at one end thereof to the plate, bracing means connected to the standard at a point other than said end and being connected with the plate remotely from said standard, means adjustably interconnecting the aneroid and standard and mounting the aneroid in normally fixed relation on the standard, with the axis of the aneroid extending substantially parallel to said plate, the pivotal axis of the pointer being substantially at right angles to said plate, and the mechanism including an operating element mounted for rotation on said plate about an axis perpendicular to said plate.

12. An altimeter having an aneroid, a rotatable pointer, a scale therefor, mechanism operated by said aneroid for actuating the pointer, a casing for said aneroid and mechanism, said pointer and scale being at the front of the casing, said aneroid and mechanism being disposed substantially on opposite sides of the axis of the pointer, a link member interconnecting the aneroid and mechanism for operation of the latter by the aneroid, and means for mounting the aneroid and for adjustably moving the same toward and away from said mechanism, said means being so independent of the aneroid as not to affect the tension thereon, and the casing having an opening for access of the adjusting means from the outside.

13. A device including a pressure sensitive diaphragm, an indicator, mechanism for actuating the indicator having a pivoted arm, a link interconnecting said arm with a central point of the diaphragm, supporting means for the diaphragm and mechanism, said supporting means having a degree of resilience, and movable means independent of the diaphragm, said movable means being adapted to spring the support to change the setting of the mechanism without affecting the action of the diaphragm.

14. A device including an aneroid, an indicating element, mechanism operated by the aneroid for actuating the element, a casing for said mechanism and aneroid, a support for the aneroid and mechanism in said casing, a link interconnecting the aneroid and mechanism, said support being yieldable for movement of the aneroid in the general direction of its expansion, and means independent of the aneroid to spring said support to affect a setting of the mechanism without affecting the tension on the aneroid.

15. A device including an aneroid, an indicating element, mechanism operated by the aneroid for actuating the element, a link interconnecting the aneroid and mechanism, supporting means for the aneroid and mechanism, said supporting means being yieldable for setting movement of the aneroid in the general direction of its expansion, means for causing a yielding motion of the supporting means for producing the setting motion without affecting the tension on the aneroid, and other means for independently centrally adjustably mounting the aneroid for a movement of the aneroid in either of the general directions of its expansion or contraction.

16. A device including a rotatable indicating element, an aneroid, mechanism for actuating the element, said mechanism including a shaft having a laterally extending arm connected thereto, a thermostatic link connected at one end to the arm and at the other end to the aneroid at the center thereof, said link extending in the general direction of the aneroid axis and substantially at right angles to the axis of said shaft, said link being generally at an angle to said arm, and said mechanism including a gear train operated by said shaft for rotating the indicating element.

17. A device including an aneroid, an indicator, and mechanism including a shaft lying in a plane at right angles to the axis of the aneroid, an arm mounted on said shaft and being deformable so that the free end of said arm is adapted to be sprung toward and away from the shaft, means on said shaft for controlling the deformation of said arm, a link pivotally connected to said arm and to a central point of the aneroid, said link extending in the general direction of the aneroid axis, a gear fixedly mounted on said shaft, and a gear train operated by said gear for actuating the indicator, said gear train including gears having their axes parallel to said shaft and being located intermediate of said aneroid and said shaft.

18. A device including an aneroid, indicating means actuated thereby, a dial associated with said indicating means, a plurality of members spaced to receive the aneroid therebetween, mechanism actuated by said aneroid for operating the indicating means, said members being parallel to the dial and the aneroid having its axis extending substantially parallel to said members and being expansible in said parallel direction, a plurality of spaced standards interconnecting said members, said aneroid being mounted on one of said standards, and said mechanism being in proximity to and mounted on the other of the standards and on one of said members and being operative by expansion of the aneroid in said direction.

19. A device including a casing, a frame therein including a plurality of spaced standards, a plurality of spaced elements interconnecting the standards, an aneroid mounted on one of the standards, mechanism actuated by the aneroid, the other standard and one of the said elements constituting a support for said mechanism, a pointer rotatable by said mechanism about an axis at right angles to said elements, a circular scale for the pointer concentric therewith, said frame being adapted to be sprung, and adjusting means for springing said frame so as to change the relation between the aneroid and mechanism for setting the device without changing the tension on said aneroid, and said casing having an opening whereby the adjusting means is actuable from the outside thereof.

20. A device including an aneroid, mechanism actuated thereby, supporting means for the aneroid and mechanism, said supporting means being yieldable for setting movement of the aneroid in the general direction of the aneroid's expansion, means for causing a yielding motion of the supporting means for producing the setting motion without affecting the tension on the aneroid, and other means for independently adjusting the setting relation between the aneroid and mechanism by causing a movement in said general direction of the aneroid relative to the supporting means, and said mechanism including a thermostatic link pivotally connected to the center of the aneroid and extending in said general direction, said link being laterally deformable for varying the length thereof to adjust the device.

21. A device including an indicator, a casing therefor, a relatively stationary dial plate for the indicator, and means for rotatably mounting said indicator including a circular rotary member of large diameter, said casing having a bearing for engaging the peripheral portion of the rotary member, the indicator being mounted on the latter, and resilient means mounted adjacent the bearing and acting on the rotary member for causing an easy rotation of the rotary member.

22. A device including an indicator, a casing therefor, a relatively stationary dial plate for the indicator, and means for rotatably mounting said indicator including a circular rotary member of large diameter, said casing having a bearing for engaging the peripheral portion of the rotary member, and a sinuous strip spring extending along the bearing in sliding contact with the rotary member to cause the latter to be journaled for an easy rotation in the bearing.

23. A device including a casing, a plate therein, an aneroid actuated mechanism mounted on the plate, said casing having means providing a bearing for rotatably mounting the plate, with the latter resting against a side of the bearing, and yielding means acting between the plate and casing to cause the plate to have an easy rotation against the side of the bearing.

24. A device including a casing, a supporting member therein, an operating instrumentality mounted on the member, said member being of large diameter and the casing having means providing a bearing for receiving a peripheral portion of the member with the member resting against a side of the bearing, and yielding means extending along the bearing and causing the member to have easy rotation against said side of the bearing.

PAUL KOLLSMAN.